Figure 1:
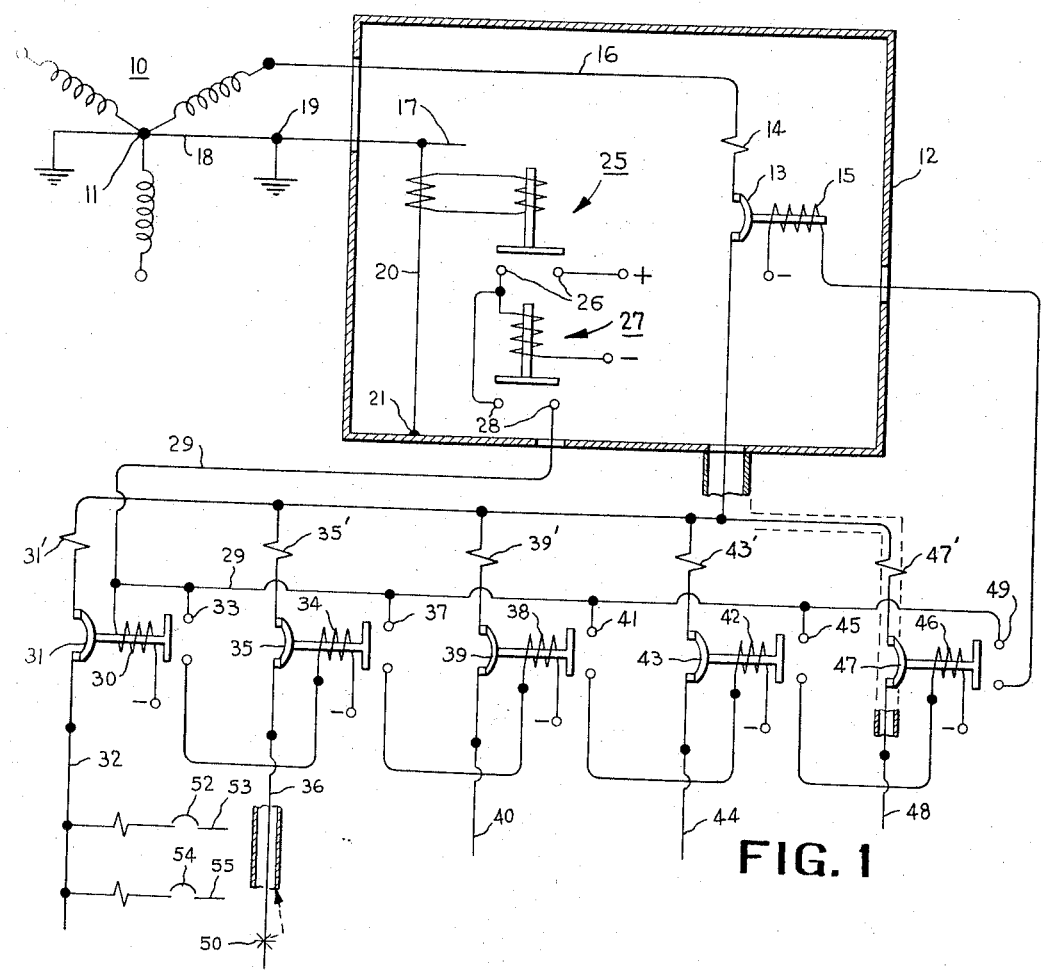

April 18, 1967   L. E. FISHER   3,315,129
CIRCUIT PROTECTIVE SYSTEM
Filed Oct. 29, 1964

INVENTOR.
LAWRENCE E. FISHER
BY Robert H Casey
ATTORNEY

United States Patent Office 3,315,129
Patented Apr. 18, 1967

3,315,129
CIRCUIT PROTECTIVE SYSTEM
Lawrence E. Fisher, West Hartford, Conn., assignor to General Electric Company, a corporation of New York
Filed Oct. 29, 1964, Ser. No. 407,458
7 Claims. (Cl. 317—18)

The present invention relates to the protection of electrical distribution systems, and particularly to protection of electrical distribution systems of the type including a main feeder conductor and a plurality of branch feeder conductors connected thereto, each of the main and feeder circuits having its own separate protective device, and, more particularly, to the protection of such systems from arcing or ground faults.

Conventional protective equipment for electrical power distribution systems commonly include appropriate equipment for sensing and individually isolating overload and short-circuit abnormalities occurring in the main and the various feeder and branch circuits. This equipment typically includes a main circuit protective device, feeder circuit protective devices, and branch circuit protective devices. Such devices for example, ordinarily comprise automatic operating electric circuit breakers, or switches combined with fuses. Occasionally, however, ground faults occur which involve currents of insufficient magnitude to operate such circuit breakers or fuses, or to do so quickly enough to prevent serious arcing damage. For this purpose, special protective equipment involving sensitive ground-current detecting relays or circuit imbalance relays have been developed. A circuit including a relay of this type is shown, for example, in my prior application Ser. No. 248,544 filed Dec. 31, 1962, now U.S. Patent 3,233,151 and assigned to the same assignee as the present invention. Such "arcing fault relays" are relatively expensive, however, and require a substantial amount of space. They add substantially to the cost of protective equipment for an electrical system since they must be used in addition to the conventional protective devices previously referred to. For this reason, such arcing fault relays, when used, are often included only in the main switchboard, and protect the main circuit. When a fault occurs and the relay operates, therefore, the entire system is inactivated. This is true even though the ground fault involved may have taken place relatively far out on one of the branch circuits. The alternative, of course would be to utilize an arcing fault relay in each of the feeder or branch circuits but as previously stated this would involve a substantial cost.

It is an object of the present invention to provide a system for the protection of electrical distribution equipment of the type having a main circuit connected to a plurality of feeder and branch circuits which utilizes only a single arcing fault relay but which will protect the system without necessarily disconnecting all of the feeder and branch circuits.

It is another object of the invention to provide a protective system of the type described which utilizes conventional existing automatic circuit breakers and auxiliary circuit breaker equipment.

In accordance with the invention, I provide an electrical protective system including a single arcing fault relay which is arranged in the main line of an electrical power supply. The system further includes means for initiating the disconnection of the various feeder circuits in a predetermined sequence upon actuation of the arcing fault relay, and means for preventing the disconnection of further feeder circuits after the particular feeder circuit has been disconnected in which the fault exists. Since there are at times as many as five or more feeder circuits which are supplied by a single main circuit, there is always a good possibility that the fault will be removed before all feeder circuits have been disconnected. In accordance with the invention in one form, the arcing fault relay, after initially allowing time for circuit breakers to operate which are protecting the individual branch circuits, proceeds to initiate tripping of the first selected feeder circuit breaker. When the first feeder circuit breaker opens, it operates a pair of auxiliary contacts which initiate tripping of the next selected feeder circuit breaker. The next feeder circuit breaker operates a further breaker in the same manner, and so on until the feeder circuit breaker of the particular feeder line in which the fault exists is opened. When this occurs, it de-energizes the arcing fault relay, which then discontinues the tripping process.

The invention will be more fully understood from the following detailed description, and its scope will be pointed out in the appended claims.

Figure 2:
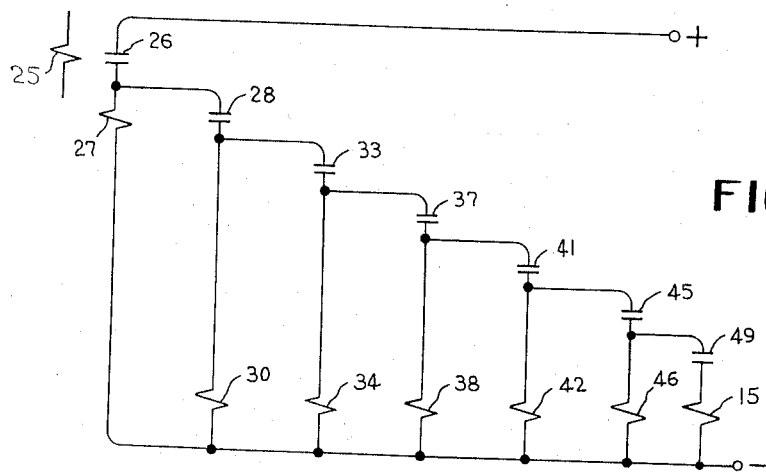

In the drawing,

FIGURE 1 is a schematic circuit diagram of an electrical power distribution system incorporating the invention, and FIGURE 2 is a schematic diagram of the control circuitry for the relays involved in the arrangement of FIGURE 1.

Referring to FIGURE 1, the invention is shown by way of example as incorporated in an electric power distribution system deriving power from a three-phase power source 10 of the grounded-Y type, the neutral point 11 of the system being grounded at the power source as shown. Although only a single-line type diagram is used for convenience, it will be understood that the main, feeder and branch circuits shown may be and ordinarily are three-phase circuits, and the circuit breakers shown such as 13, 31, etc., in such case would be three-pole breakers. In the embodiment illustrated, a switchboard housing 12 is shown containing a main circuit breaker 13 having an overload sensing means 14 and a trip coil 15. The main circuit breaker 13 is connected to one phase of the power source 10 by main conductor 16 as shown. A neutral conductor 17 is connected directly to the neutral point 11 of the power source 10 by a conductor 18. The conductor 18 is grounded adjacent the switchboard housing 12 at the point 19. The housing 12 is connected to the neutral 17 by conductor 20, at point 21. It will be noted that the point 21 is the only point of connection of the enclosure 12 to the neutral 17. If there is accidental contact of any of the conductors with the housing anywhere in the system, therefore, the arcing current which flows returns to the system neutral 11 through the conductor 20.

Connected to the main conductor 16 are plurality of feeder circuit conductors 32, 36, 40, 44, 48. Each of the feeder circuits is protected by a corresponding circuit breaker 31, 35, 39, 43, 47 having an abnormal current-sensing device 31', 35', 39', 43', 47' respectively. Branch circuits are connected to each of the feeder circuits, such as shown at 53, 55 connected to feeder circuit 32.

It will be understood that each of the feeder lines 32, 36, 40, 44, 48, feed branch lines such as lines 53, 55 shown in connection with line 32, and that such feeder lines supply current to electrical power consuming devices. The return conductors for such devices and circuits, not shown, would ordinarily be provided by the three-phase conductor system, or if single-phase by "neutral" conductors leading back to the neutral connection point 17. In systems of the type described, such neutral or return conductors would be insulated from the metallic material of the conduit or busway housing and the switchboard housing. Since such conductors connect to the conductor 18 at the point 17 which is beyond the arcing fault relay 25, current flowing through such neutral conductor does not affect the arcing fault relay 25.

The operation of the circuit breakers 13, 31, 35, 39, 43, 47, in the detection of overload and short-circuit current conditions in their corresponding circuits is conventional. The present invention, however, relates to the detection of ground-fault currents which may not be sufficient to operate these breakers.

The flow of current through the conductor 20 is detected by an arcing fault relay 25 which is inductively coupled to the conductor 20. Actuation of the arcing fault relay 25 closes the contacts 26 and energizes the time delay relay 27. When the relay 27 is energized, it closes the contacts 28 and energizes the bus 29.

As soon as the bus 29 is energized, the trip coil 30 of the first feeder circuit breaker 31 is energized and trips this circuit breaker. Tripping of the circuit breaker 31 disconnects the first feeder line 32 from the circuit. When the circuit breaker 31 is tripped and moves to its open circuit position, it closes auxiliary contact 33 which then energizes the trip coil 34 of the circuit breaker 35 controlling the feeder circuit 36. As the circuit breaker 35 opens, it closes auxiliary contact 37, energizing trip coil 38 of the next circuit breaker 39. The feeder circuit 40 is disconnected by the opening of the circuit breaker 39. In a similar manner the circuit breakers 43 and 47 are opened in sequence.

When the last circuit breaker 47 opens, it closes contacts 49 thereby energizing the trip coil 15 of the main circuit breaker 13, tripping this circuit breaker and disconnecting the main circuit.

In operation, assuming all circuit breakers to be closed, if a fault should occur on one of the feeder lines, for example on the line 36 as indicated at 50 in FIGURE 1, the flow of current back to the neutral through the housing of the system to the conductor 20, energizes the arcing fault relay 25. This immediately closes the contact 26, energizing the time delay relay 27. Time delay relay 27 allows a small time, such as four cycles, to elapse before initiating tripping of the first feeder circuit breaker. This allows enough time for "down-stream" branch circuit breakers such as 52, 54, shown on feeder circuit 32 to open, if the fault should be on the lines 53 and 55 protected by these circuit breakers. After four cycles, the contact 28 is closed, energizing the bus 29 and the trip coil 30. This immediately trips the circuit breaker 31, disconnecting the feeder line 32. Since the assumed fault is not on this line, the ground fault current through conductor 20 continues. When the circuit breaker 31 moves to the open circuit position, it closes contact 33, and energizes the trip coil 34 of the next circuit breaker 35. This opens the next circuit breaker 35, disconnecting the line 36. Since this is the assumed faulted line, the fault current through the conductor 20 is reduced to zero, de-energizing the arcing fault relay 25 and opening the contacts 26. This de-energizes the bus 29, and therefore no further tripping occurs. Thus the remaining feeder lines 40, 44, and 48 are not disconnected and may remain in use.

In order to minimize the possibility of "over-shooting" that is, disconnecting more feeder lines than is necessary to remove the fault, the contacts 33, 37, 41, 45, and 49 may each be operated by time-delay means so as to introduce a short time-delay between the opening of the corresponding circuit breaker and closing of such contacts. Thus for example, a time-delay means may be introduced between the opening of the circuit breaker 31 and the closing of the contact 33. This would allow time for the arcing fault relay 25 to open, de-energizing the bus 29 if the fault happens to be on line 32. The same would apply to each of the other feeder lines.

As may be observed, particularly from FIGURE 2, if any of the circuit breakers happens to be in the open condition when a fault occurs, so as to cause any of the contacts 33, 37, 41, 45, and 49 to be in the closed position, this would not interfere with the operation of the system, and the tripping would proceed to the next feeder line. This operation may be observed particularly from the control schematic diagram of FIGURE 2.

It should be understood that while I have shown a time-delay relay 27 separate from the arcing fault relay 25, such time-delay action may well be incorporated in relay 25, and relay 27 omitted. In any case, however, it is necessary that the relay or relay combination open extremely quickly upon termination of the fault current in order to avoid "over-shooting" or disconnection of more feeder lines than necessary. For this purpose the relay 25 or its equivalent is preferably provided with relatively light moving parts and a relatively strong opening spring, not shown, biasing its contact to open position at all times.

The form of the circuitry shown in FIGURE 2 is preferred to that of FIGURE 1 for the following reason. With the arrangement of FIGURE 1, if a given feeder circuit breaker should be in the open circuit position at the time the relay 25 operates, its auxiliary contacts would be closed and so the next breaker in the sequence would be operated to open condition at once, without waiting for the preceding breakers in the sequence. This will not occur with the arrangement shown in FIGURE 2.

While the invention has been described in one particular embodiment it will, of course, be readily appreciated that many variations thereof may easily be made. It is therefore intended, by the appended claims, to cover all such variation and modifications as fall within the true spirit and scope of the invention.

What I claim as new and desire to secure by Letters Patent of the United States is:

1. An electrical protective system for use with an electrical distribution system of the type including a main power line, a plurality of feeder lines connected thereto and automatic circuit opening means in connection with each of said main and feeder lines responsive to abnormal current conditions of a first type, said electrical protective system comprising:

(a) fault current detecting means responsive to abnormal current conditions of a second type, (b) means actuated by said fault current detecting means when energized for initiating opening of a first one of said feeder automatic circuit opening means, (c) means actuated by said first feeder automatic circuit opening means for initiating the opening of the remainder of said feeder automatic circuit opening means in predetermined sequence, (d) means actuated by the last of said feeder automatic circuit opening means in said sequence to cause automatic opening of said main automatic circuit opening means, and (e) means for discontinuing said sequential opening of said feeder automatic circuit opening means upon de-energizing of said fault current detecting means.

2. An electrical protective system for use with an electrical distribution system of the type having a main power line and a plurality of feeder power lines connected thereto and circuit protective devices in each of said main and feeder power lines responsive to abnormal current conditions of a first type, said electrical protective system comprising:
- (a) a single abnormal current detecting device responsive to abnormal current conditions of a second type connected to detect the existence of abnormal conditions of said second type in any of said feeder lines,
- (b) means for operating said protective devices of said feeder lines in predetermined sequence upon actuation of said abnormal current detecting device,
- (c) means actuated upon opening of the last of said circuit protective devices in said sequence for causing opening of said circuit protective device of said main power line, and
- (d) means for discontinuing said opening of said feeder protective devices upon removal of said second type of abnormal condition.

3. For use in an electrical distribution system of the type including a main power line and a plurality of feeder power lines connected thereto, circuit protective devices in each of said main and feeder circuits responsive to abnormal current conditions of a second type and metallic electrically common housing means for each of said main and feeder lines, means for connecting said main power line to one side of an electrical power source, a conductor for connecting said housing means to the other side of said electrical power source, said electrical protective system comprising:
- (a) a fault current relay responsive to abnormal current conditions of a second type connected to be operated upon flow of predetermined curent through said conductor,
- (b) means for operating said protective devices of said feeder lines in a predetermined sequence,
- (c) means for initiating operation of said sequential opening of said feeder circuit protective devices upon energizing of said fault current relay,
- (d) means discontinuing said sequential opening of said feeder circuit protective devices upon removal of said predetermined current, and
- (e) means operated by the last of said feeder protective devices in said sequence for opening said main circuit protective device.

4. An electrical protective system for use in an electrical distribution system of the type including a main power line and a plurality of feeder power lines connected thereto, circuit protective means in each of said main and feeder lines responsive to abnormal current conditions of a first type, electrically common housing means for all of said main and feeder power lines, means for connecting said main power line to one side of an electrical power source, a conductor for electrically connecting said housing means to the other side of said electrical power source, said electrical protective system comprising:
- (a) a fault current relay responsive to abnormal current conditions of a second type connected to be operated upon flow of predetermined current through said conductor,
- (b) a sequentially operating relay system connected to said feeder lines for opening said feeder lines in a predetermined sequence,
- (c) means operated by said fault current relay for initiating said sequential opening of said feeder protective device,
- (d) means discontinuing said sequential opening of said feeder protective devices upon the reduction of said predetermined current to zero, and
- (e) means operated by the last of said feeder protective devices in such sequence for opening said main circuit protective device.

5. An electrical protective system for use in an electrical distribution system of the type including a main power line and a plurality of feeder power lines connected thereto, circuit controlling means in each of said main and feeder power lines and a metallic electrically common housing means for each of said main and feeder lines responsive to abnormal current conditions of a first type, means for connecting main power line to one side of an electrical power source, a conductor for connecting said housing means to the other side of said electrical power source, said electrical protective system comprising:
- (a) a fault current relay responsive to abnormal current conditions of a second type connected to be operated upon flow of predetermined current through said conductor,
- (b) auxiliary contact means operated by each of said circuit protective means of said feeder lines,
- (c) each of said auxiliary contacts of all of said feeder circuit protective devices except one being connected to cause automatic opening of another of said feeder circuit protective devices, whereby opening of a first one of said feeder circuit protective devices cause sequential opening of the remainder of said feeder circuit protective devices,
- (d) contact means operated by said one feeder circuit protective device connected to operate said circuit protective device of said main line,
- (e) said means for sequentially operating said feeder circuit protective devices being de-energized upon opening of said fault current relay.

6. An electrical protective system for use with an electrical distribution system of the type comprising a main power line and a plurality of feeder-lines connected thereto, an automatic electric circuit breaker in each of said main and feeder power lines responsive to abnormal current conditions of a first type, means for connecting said main line to an electrical power source, electrically common housing means for all of said main and feeder power lines, and conductor means for connecting said housing means to a ground potential point of said power source, said electrical protective system comprising:
- (a) a ground fault detecting relay responsive to abnormal current conditions of a second type connected to said conductor means for operation upon the flow of predetermined current therethrough,
- (b) a remotely operable trip coil in each of said main and feeder circuit breakers,
- (c) normally open auxiliary contact means in each of said feeder circuit breakers and means in each of said circuit breakers for closing said auxiliary contacts when its circuit breaker is in its open condition,
- (d) a pair of first trip contacts operated upon movement of said ground fault detecting relay to closed condition,
- (e) said first trip contacts being connected between a voltage source and said trip coil of a first one of said feeder circuit breakers,
- (f) said auxiliary contacts of each succeeding one of said feeder circuit breakers being connected between the auxiliary contacts of a preceding one of said feeder circuit breakers and the trip coil of a succeeding circuit breaker, and
- (g) said auxiliary contacts of the last of said feeder circuit breakers being connected to said trip coil of said main circuit breaker.

7. An electrical protective system for use with an electrical distribution system of the type including a main power line, a plurality of feeder lines connected thereto, and automatic circuit opening means in connection with each of said main and feeder lines responsive to abnormal current conditions of a first type, said electrical protective system comprising:
- (a) fault current detecting means in said main power line actuated in response to abnormal current conditions of a second type;
- (b) sequential opening means for operating said automatic circuit opening means of said feeder lines to disconnect said feeder lines in a predetermined sequence;

(c) means for initiating operation of said sequential opening means upon actuation of said fault current detecting means upon the occurrence of abnormal current conditions of said second type in one of said feeder lines; and
(d) means for discontinuing sequential opening of said sequential opening means upon disconnection of the feeder line in which said abnormal current conditions of said second type have occurred.

References Cited by the Examiner

UNITED STATES PATENTS

| | | | |
|---|---|---|---|
| 1,717,240 | 6/1929 | Miki | 317—26 X |
| 2,700,133 | 1/1955 | Pfleger | 317—139 X |
| 3,233,151 | 2/1966 | Fisher | 317—18 |

MILTON O. HIRSHFIELD, *Primary Examiner.*

J. D. TRAMMELL, *Assistant Examiner.*